Patented Oct. 8, 1946

2,409,173

UNITED STATES PATENT OFFICE 2,409,173

PROCESS FOR PREPARING STABLE ROSIN ESTERS

Frederick J. Webb, Passaic, N. J., assignor to Ridbo Laboratories, Inc., Paterson, N. J., a corporation of New Jersey No Drawing. Application November 11, 1943, Serial No. 509,901

11 Claims. (Cl. 260—104)

This invention relates to treatment of acidic rosin materials, and is especially concerned with the production of stable rosin esters from such acidic rosin materials.

Treatment of various rosin materials with sulfur in certain percentages and under certain treatment conditions tends to reduce the unsaturation and instability which is characteristic of rosins.

In the preparation of esters, I have found it advantageous to concurrently subject acidic rosin materials to sulfur treatment and to esterification. The products produced in this way are esters having greatly reduced unsaturation and greatly increased stability, especially as against oxidation. Liquid esters produced according to this invention also display greatly increased resistance to solidifying, for instance in the form of a film, and also to embrittlement after solidification.

The products of the invention, therefore, are better adapted to many uses than are other rosin esters. For instance, the products are well suited to employment in the coatings and plastic industries, and also as plasticizers.

By simultaneously subjecting the acidic rosin material to both sulfur treatment and esterification, only a single stage of treatment or heating is required in producing a stable rosin ester. Depending upon the treatment conditions employed, the esters produced according to this invention not only have the desirable characteristics of increased stability and reduced unsaturation, but such products may also have quite light color, which is of importance for many uses.

The treatment of the invention may be applied to any acidic rosin material, especially the various grades of gum and wood rosins of commerce, and also to materials such as abietic acid and other rosin acids in more or less pure form. Use of such other acidic rosin materials is herein considered as the equivalent of the employment of rosin itself.

In carrying out the treatment, for instance to make the glycerol ester, the rosin is heated desirably between about 150° C. and 300° C., for example to about 270° C., at which temperature both the glycerol and the sulfur may be added. The glycerol and sulfur may be added separately or mixed together, or one may be added ahead of the other, it being contemplated, however, that both the reaction involved in sulfur treatment and the esterification take place at least in part concurrently. The treatment temperature should be varied somewhat depending upon the particular ester being formed. It may also be important to vary other treatment conditions, for instance, the pressure, which may desirably be above atmospheric, especially where the alcohol being used has a relatively low boiling point.

With further reference to the temperature, it is pointed out that acidic rosin materials ordinarily tend to decarboxylate if heated for an appreciable length of time at temperatures upwards of about 240 or 250° C. I have found, however, that in the present treatment process, temperatures even as high as 270 to 280° C. do not result in extensive decarboxylation, this point being of substantial importance from the standpoint of esterification, since esterification with certain alcohols such as glycerol takes place more rapidly and to best advantage at temperatures in the neighborhood of 270° C. For many alcohols, the most effective esterification temperature usually lies between about 250° C. and 300° C. Thus, notwithstanding the fact that the preferred temperature according to the present invention (in the neighborhood of 270° C. when making the glycerol ester) is somewhat above that point at which appreciable decarboxylation would occur merely by heating the rosin either alone or in the presence of sulfur, this does not occur when operating according to the present invention.

With the foregoing consideration in mind it is ordinarily desirable to avoid heating at the elevated temperature for an extended period of time prior to the addition of the sulfur and glycerol or other alcohol. If desired, either the sulfur or glycerol or both may be added to the rosin during rise in temperature, before the preferred temperature is reached.

The alcohol to be employed in preparation of the ester will depend primarily on the type of ester desired. The alcohols in general, may be employed, either monohydric or polyhydric, for instance glycerol, pentaerythritol, methyl alcohol, tetrahydrofurfuryl alcohol, and octadecyl alcohol. The employment of glycerol yields a stable ester, i. e., a stable "ester gum," which is a solid. On the other hand employment of methyl alcohol yields a liquid ester manifesting not only the reduced unsaturation and increased stability herein above mentioned but also increased resistance to solidifying and embrittlement.

With respect to the quantity of sulfur to be used, the amount may be varied over a wide range, for instance from about 0.5% up to about 20 or 25%, although ordinarily not more than about 10 or 15% is needed to attain maximum decrease in unsaturation and increase in stability.

Even as little as 1 or 2% extensively decreases the unsaturation of the product and according to the present invention it is preferred to employ only a relatively small quantity of sulfur, for instance from about 0.5% up to about 4 or 5%. One reason why the lower percentages are advantageous is that the esterification requires a considerable period of time, and if large quantities of sulfur are present and heated with the rosin for a considerable time, the product tends to darken. I have found that a product of quite light color may be secured by the employment of about 1 to 3% of sulfur, the said product having extensively decreased unsaturation and increased stability.

Moreover, it is to be noted that sulfurization to decrease unsaturation and increase stability is highly effective at the relatively high temperatures preferred for esterification, in view of which only very small quantities of sulfur are ordinarily needed to secure a product having extensively decreased unsaturation. The advantage of the relatively high temperature just mentioned can readily be attained without incurring appreciable decarboxylation, since, as above mentioned I have found that the decarboxylation does not as readily take place in the presence of the glycerol or other alcohol employed for esterification.

Usually it is desirable to carry on the treatment in the presence of an inert atmosphere such as $CO_2$.

EXAMPLES

*Example 1*

WW wood rosin was heated with 12.5% of glycerol and with 10.6% of sulfur, the heating being continued for 8 hours at a temperature of about 265–270° C. During the first six hours of this time the sulfur was added in increments at about half hour intervals. Throughout the 8 hour treatment period the mixture was stirred and was maintained in an atmosphere of carbon dioxide.

At the end of the 8 hour period the excess glycerol was distilled off at about 270° C. at a pressure of 15 mm. Hg.

The product had an acid number of 13, a saponification number of 168, and a Hubl iodine number of 19.

*Example 2*

In this example WW wood rosin was again treated with glycerol in the same general manner as described above under Example 1 except that 5% of sulfur was employed instead of 10.6% as in Example 1.

The product had an acid number of 34, a saponification number of 162, and a Hubl iodine number of 29.

*Example 3*

About 600 grams of WW wood rosin were melted with 70 grams of glycerol in an atmosphere of carbon dioxide. This mixture was then heated up to about 150° C., at which temperature 64 grams (about 10.6%) of sulfur were added, with stirring during 10 minutes. The temperature was then raised and kept at about 265–275° C. for 12.5 hours. An additional 15 cc. of glycerol was then added and the heating continued at the same temperature for another 5½ hours.

The product had an acid number of 13, a saponification number of 163, and a Hubl iodine number of 28.

*Example 4*

WW wood rosin was heated up to 265° C. and at that temperature a mixture of about 12% of glycerol and 2% of sulfur were added during 10 minutes with stirring in a $CO_2$ atmosphere. The heating was continued (with stirring and in a $CO_2$ atmosphere) for 10 hours at a temperature in the neighborhood of 270° C. The pressure was then reduced to 15–20 mm. Hg, the temperature still being maintained, in order to eliminate any unreacted glycerol. The product was an unusually light colored (Hellige 6–7), hard and brittle solid having an acid value of 21, a saponification value of 167, and a Hubl iodine number of 47.

*Example 5*

This example illustrates the preparation of the octadecyl alcohol ester of WW wood rosin. 150 grams of WW wood rosin and 175 grams of octadecyl alcohol were heated up to 200° C. with stirring in a $CO_2$ atmosphere. 3 grams (2%) of sulfur was then added and the temperature raised to 265–275° C. and kept there for about 21 hours with continued stirring.

The excess alcohol was then eliminated by distillation at about 1 mm. Hg, while gradually raising the temperature to a maximum of 295° C.

The ester product was a brownish-yellow liquid having an acid value of 5.3, a saponification value of 98, and a Hubl iodine number of 30.

*Example 6*

In this example the pentaerythritol ester of WW wood rosin was prepared.

The wood rosin and about 12.5% of pentaerythritol were heated up to 180° C. in a $CO_2$ atmosphere. 3% of sulfur was then added with stirring and the temperature was raised to about 270° C., the heating at the latter temperature being continued for about 18 hours. The product was a slightly orange-yellow, brittle, transparent solid, having an acid number of 9.2, a saponification number of 155, and a Hubl iodine number of 35.

Certain of the products above were subjected to an accelerated oxidation test carried on in the following manner:

The product was dissolved in suitable solvents and an oxidation catalyst, such as a soluble cobalt salt was added to the solution. The materials were then placed in a shaker under an initial pressure of 50 lbs. of oxygen and shaken. In a test of this type, if oxidation occurs, the pressure correspondingly drops. After extended testing the material was removed from the shaker and weighed to determine whether there was any gain in weight. The product of Examples 1, 2, and 4 above were subjected to the foregoing test over a period of 72 hours, but even during this extended test time no oxygen absorption was indicated either by the pressure drop or by the weight measurement. For comparison, various esters, including commercial ester gum, were subjected to the same accelerated oxidation test and it was found that oxidation occurred after only a few hours in the test, for instance, 2 to 8 hours. The testing of the esters prepared in the absence of sulfur was continued for a number of hours after the induction period and it was found that the materials absorbed as much as 10 to 13% of oxygen.

I claim:

1. In the production of a rosin ester of low unsaturation from rosin of high unsaturation, the process for concurrently effecting esterification and reduction of unsaturation, which process consists in heating the rosin to a temperature between about 150° C. and 300° C. and subjecting the heated rosin concurrently to the action of an alcohol and of from 0.5% to 25% by weight of the rosin of sulfur, the temperature and time of heating being sufficient to effect esterification and reduction of unsaturation.

2. A process in accordance with claim 1 in which the quantity of sulfur employed is from about 0.5% to about 5%.

3. A process in accordance with claim 1 in which the treatment temperature is above about 250° C.

4. A process in accordance with claim 1 in which the sulfur and alcohol are added to the heated rosin substantially concurrently.

5. A process in accordance with claim 1 in which the treatment is effected in an inert atmosphere.

6. A process in accordance with claim 1 in which said alcohol is glycerol.

7. A process in accordance with claim 1 in which said alcohol is diethylene glycol.

8. A process in accordance with claim 1 in which said alcohol is pentaerythritol.

9. In the production of a rosin ester of low unsaturation from rosin of high unsaturation, the process for concurrently effecting esterification and reduction of unsaturation, which process consists in heating the rosin to a temperature between about 250° C. and 300° C., and subjecting the heated rosin concurrently to the action of glycerol and of from 0.5% to 25% by weight of the rosin of sulfur, the time of treatment at said temperature being sufficient to effect esterification and reduction of unsaturation.

10. A process in accordance with claim 9 in which the quantity of sulfur employed is from about 0.5% to about 5%.

11. A process in accordance with claim 9 in which the quantity of sulfur employed is in the neighborhood of 2%.

FREDERICK J. WEBB.